United States Patent [19]

Smith

[11] 4,403,798
[45] Sep. 13, 1983

[54] LATCH ASSEMBLY FOR RAILWAY CAR HATCH COVER

[75] Inventor: Robert J. Smith, Lansing, Mich.

[73] Assignee: The General Tire & Rubber Company, Akron, Ohio

[21] Appl. No.: 273,998

[22] Filed: Jun. 15, 1981

[51] Int. Cl.³ .............................................. E05C 3/14
[52] U.S. Cl. .................................. 292/256.5; 292/238
[58] Field of Search ................. 292/238, 256.5, 230, 292/231, DIG. 49

[56] References Cited

U.S. PATENT DOCUMENTS

| | | |
|---|---|---|
| 239,824 | 8/1881 | Morris . |
| 517,605 | 4/1894 | Dolliver . |
| 1,032,559 | 7/1912 | McKee . |
| 2,744,778 | 5/1956 | Cooke . |
| 2,816,683 | 12/1957 | Miers et al. . |
| 3,433,518 | 3/1969 | Foltz . |
| 3,661,413 | 5/1972 | Silva . |
| 3,924,884 | 12/1975 | Christie . |
| 4,076,290 | 2/1978 | Swega ............................ 292/256.5 |

Primary Examiner—Richard E. Moore

[57] ABSTRACT

A latch assembly for holding one end of a hold-down strap of a hopper car hatch cover uses a counterweighted latching member that can be raised to an over-center unlocked position when the end of the hold-down strap is to be lifted. In the locked position, the latch assembly can act as a hinge for one end of the hold-down strap while the other end of the strap is raised.

3 Claims, 5 Drawing Figures

LATCH ASSEMBLY FOR RAILWAY CAR HATCH COVER

This invention relates to a latch mechanism and more particularly to a latch that is used to secure the end of a hold-down strap for a railway car hatch cover.

Latches associated with railway hatch covers have long had self-locking features, whereby the latch automatically locks in place when the hold-down strap on the hatch cover is lowered into its closed position. The latching member is usually a pivoted, counterweighted member that is deflected by the strap end moving to its closed position, and then after the strap end passes beneath the latch member, the counterweight portion on the far side of the pivot drops by gravity and causes the latch member to rotate to a position over the strap end, where it holds the strap end from a return, upward movement. An example of such a latch for a hopper car hatch cover is shown in U.S. Pat. No. 2,816,683.

The use of this counterweight principle in latch mechanisms used in other environments is shown in U.S. Pat. Nos. 239,824; 517,605; and 3,433,518.

One problem with the use of a counterweighted latch members to secure railway car hatch covers is that when the cover and hold-down strap are to be raised, the counterweighted portion of the latch member must be held up by hand to keep the latch member out of the way of the end of the strap. This makes lifting the end of the strap out of the latch mechanism a cumbersome operation.

The latch assembly of the present invention has a latch member that is counterweighted to provide automatic latching of the hold-down strap, but the latch member can also be rotated to an out-of-the-way position in which it does not have to be held by hand while the hold-down strap is being lifted. This enables one person to set the latch members for a number of hatch covers in their unlocked positions, and increases the efficiency of operations in which a number of hatch covers are to be opened.

Furthermore, the preferred form of the latch assembly of the present invention has the additional capability of functioning as a hinge for one end of the hold-down strap, while the other end of the strap is being lifted. Thus, both ends of a single hold-down strap may be secured by the latch assemblies of the present invention, giving a person the choice of which side of the hatch he wants to open. In addition, both latch assemblies may be unlocked so that the hatch cover can be completely removed from the hatch opening.

In specific terms, the latch assembly of the present invention has a latch support means connected to the frame of a railway car hatch opening and a latch member pivotally connected about a substantially horizontal axis to this latch support means. The latch member has on one side of the pivot axis a latching portion engageable with the end of a hatch cover hold-down strap, and a counterweight portion on the other side of the pivot axis. The latching portion is positioned to swing downwardly and out of the way of the end of the hold-down strap in response to engagement by the hold-down strap end during the downward travel of the strap end. The counterweight portion is positioned to drop under the force of gravity when the hold-down strap end has moved to a position below the latching portion, so as to rotate the latch member and cause the latching portion to swing upwardly and over the hold-down strap end to prevent the return, upward movement of the hold-down strap. The invention is characterized by the improvement comprising a latch member seat mounted on the latch support and located to engage and support the counterweight portion of the latch member in a raised, overcenter position, wherein the latching portion is rotated to and held in a position out of the way of the end of the hold-down strap.

In its preferred form, the latch assembly is also characterized by the improvement comprising a latch bar forming the end of the hold-down strap. The latch bar extends substantially parallel to the mentioned pivot axis of the latch member, but preferably has its end portions bent to make the bar U-shaped. Preferably, the legs of the U-shaped bar are welded to the remaining portion of the hold-down strap, thus providing a means of connecting the latch bar to the remaining portion of the hold-down strap and holding the latch bar spaced from the remaining portion of the hold-down strap.

The preferred form of the latch assembly also includes a hinge seat mounted on the latch support and located adjacent the position of the latch bar when the latching portion of the latch member has swung over the bar to prevent the return, upward movement of the hold-down strap. This hinge seat extends around the side of the latch bar opposite from the side engaged by the latching portion of the latch member, to such extent that any space between the hinge seat and the latching portion on either side of said latch bar is too small for passage of the latch bar. This hinge seat and the latching portion of the latch member thus hinge the latch bar to the hatch frame and allows the hold-down strap to be pivoted about the latch bar when the opposite end of said hold-down strap is unlatched.

A counterweighted member used in the door stop of U.S. Pat. No. 3,661,413 has a form resembling that of the latch member of the present invention, and the counterweighted portion of the member can be set in an overcenter position when it is not acting as a door stop. However, this device does not perform a latching function in either its in-use or out-of-use position.

A wire loop similar in form to the U-shaped latch bar employed in the preferred form of the present invention is shown in U.S. Pat. No. 2,744,778. However, that wire loop does not function as a latch bar held in place by another latching member; rather it is simply a handle used to rotate a lid-opening camming device.

Other patents of interest are U.S. Pat. No. 1,032,559, relating to a window lock and U.S. Pat. No. 3,924,884, relating to a door latch.

The latch assembly of the present invention, however, distinguishes from all of the other devices mentioned above by providing a counterweighted, automatic latch for a hatch cover hold-down strap that can be rotated to an out-of-the way position in which it does not have to be held by hand while the strap is lifted.

Also, in its preferred form, the latch assembly can function as a hinge for one end of the hold-down strap while the other end of the hold-down strap is lifted.

The foregoing objects, advantages, and features of the present invention will be more apparent from the following detailed description of a preferred embodiment and the attached drawings, in which.

Figure 2:
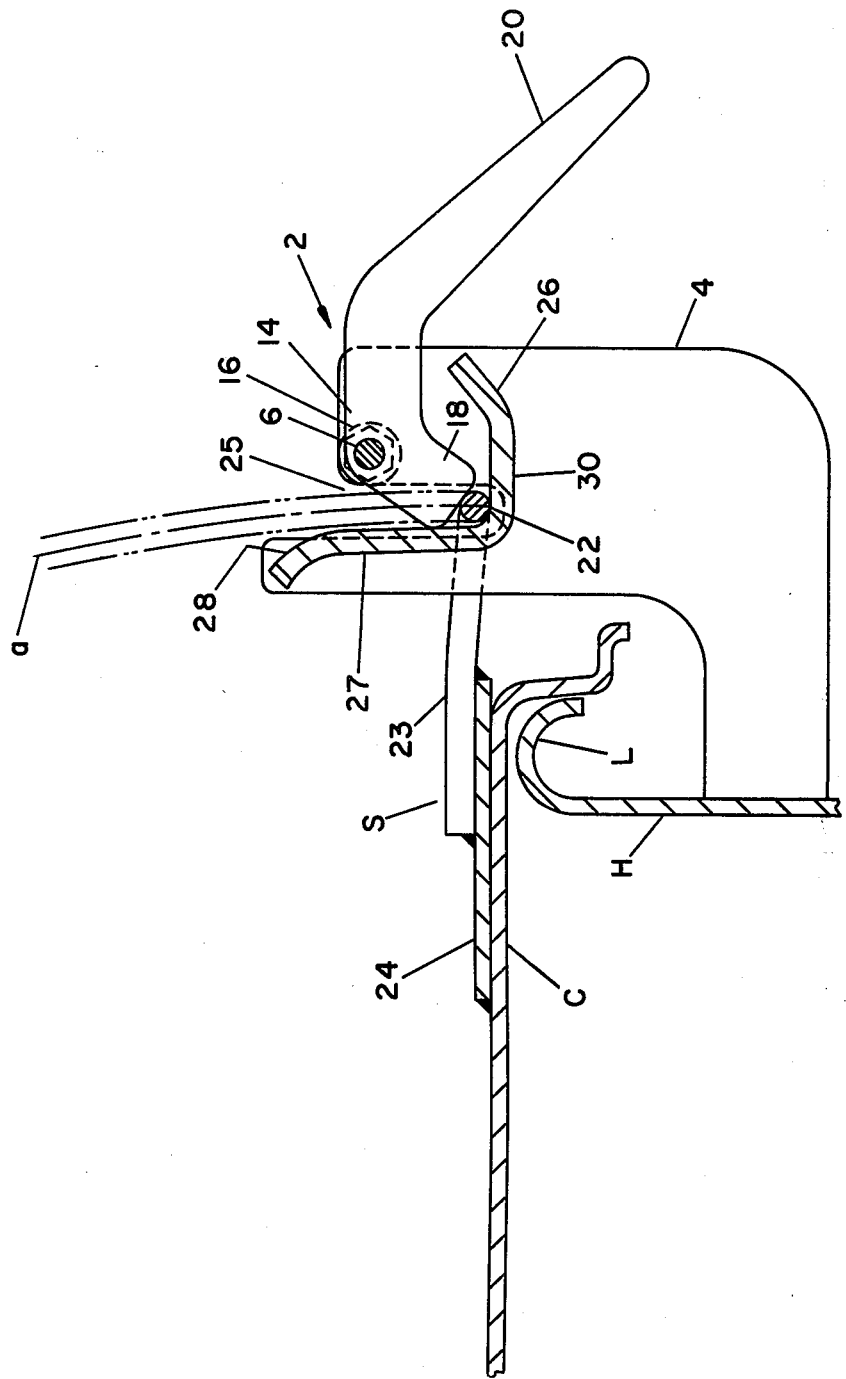
FIG. 2 is a sectional view of the latch assembly, hold-down strap, railway car hatch frame and hatch cover of FIG. 1, taken along line II—II of FIG. 1.
Figure 3:
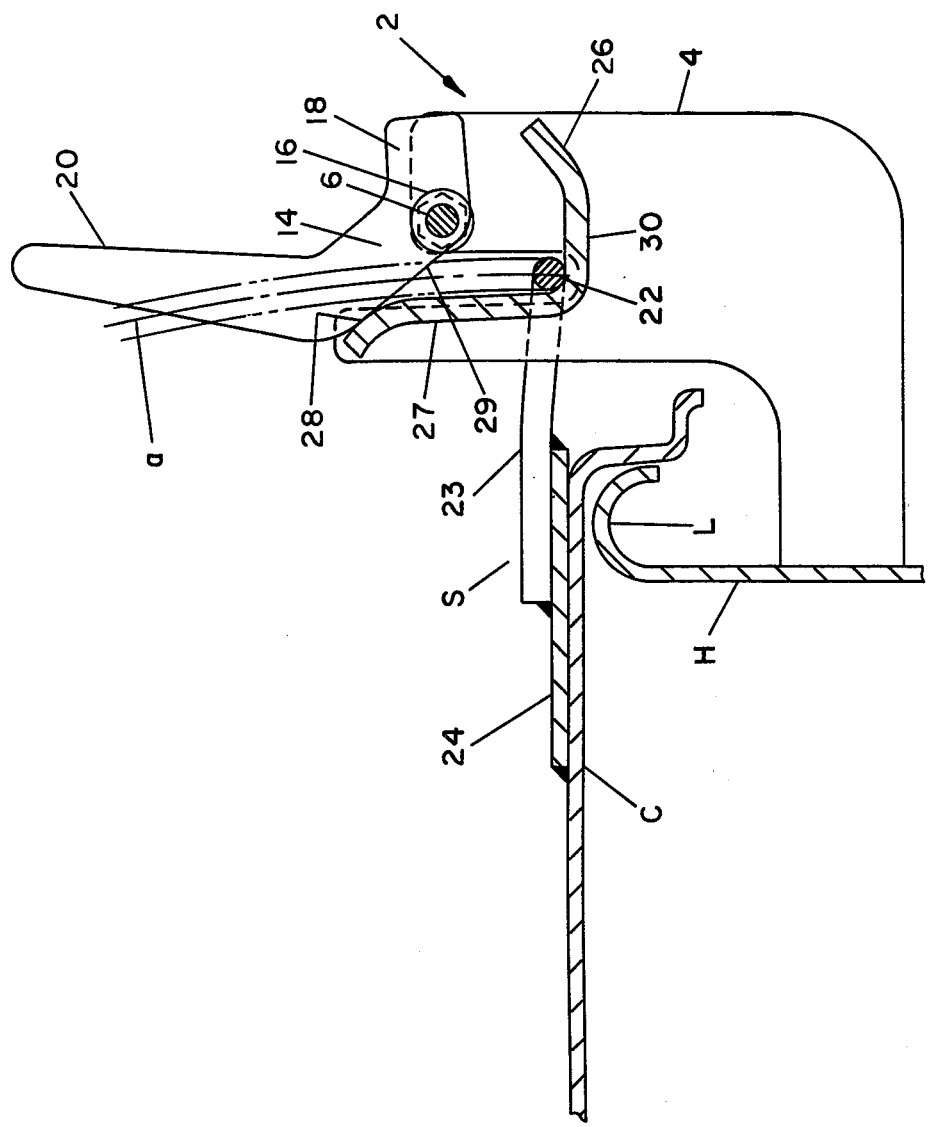
FIG. 3 is a sectional view of the same parts and taken along the same lines as in FIG. 2, but showing the latch member of the latch assembly raised to its unlocked position.
Figure 4:
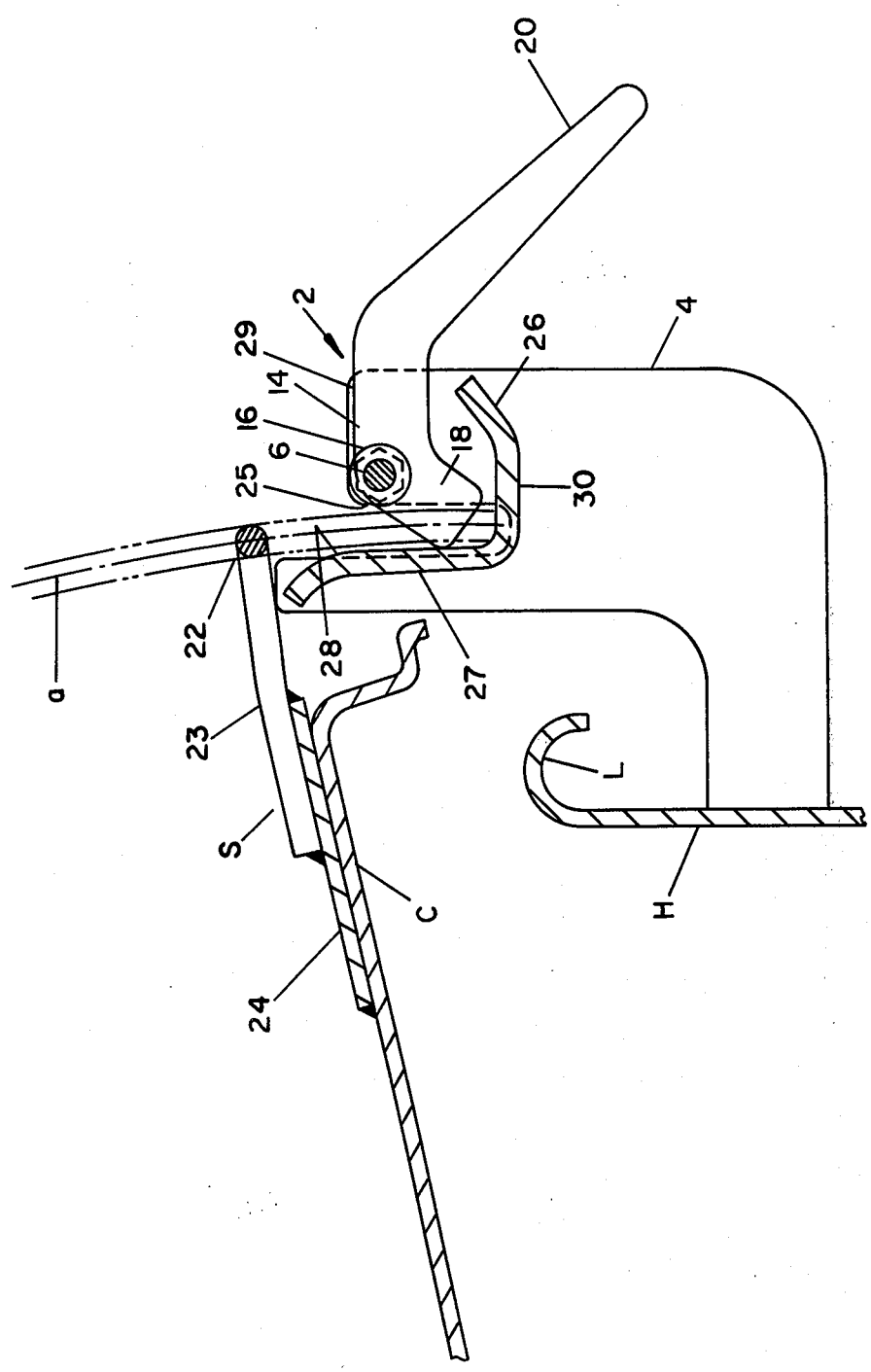
Figure 5:
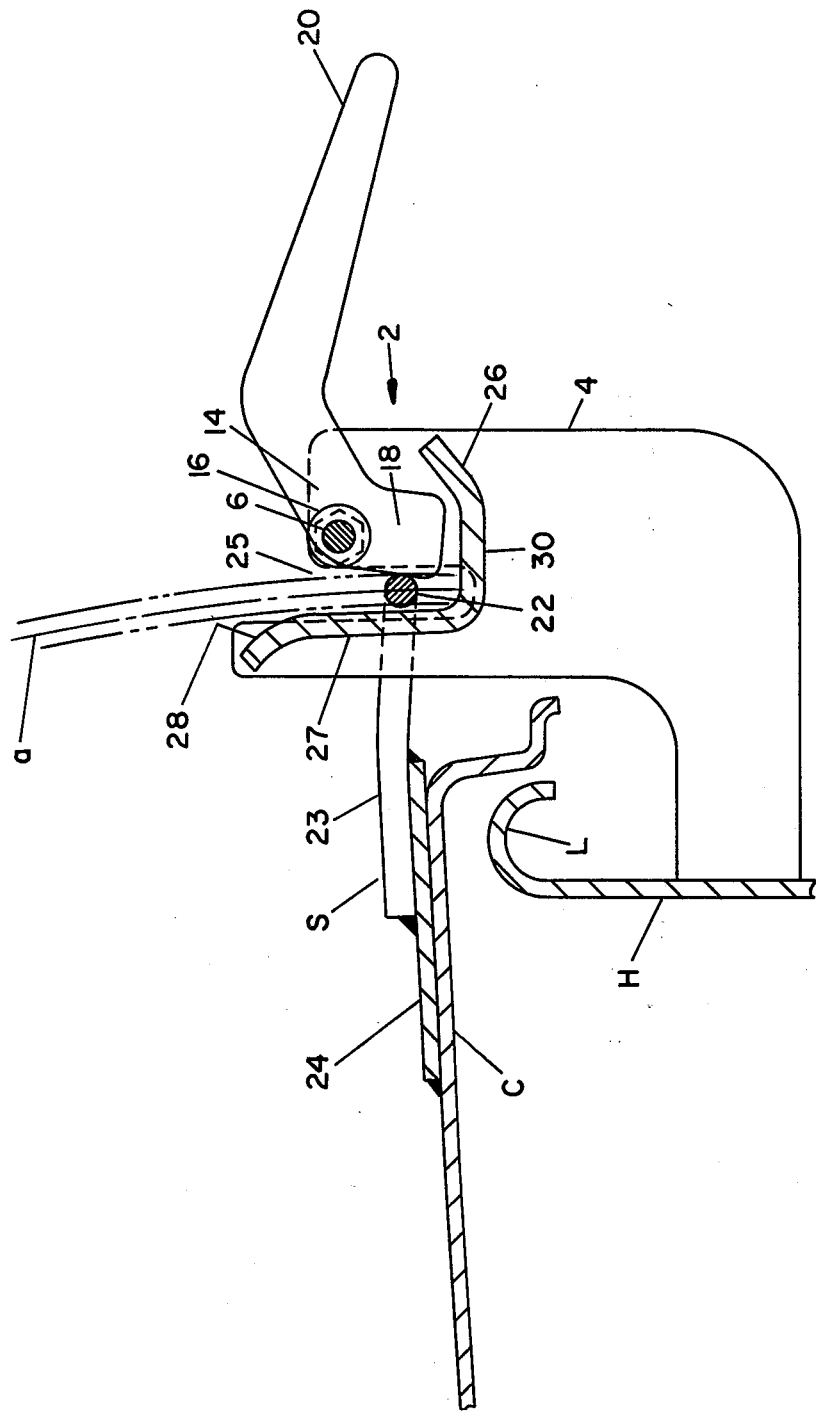

FIG. 4 is a sectional view of the same parts and taken along the same line as in FIGS. 2 and 3, but showing the hold-down strap raised and the latch member returned to its locked position; and FIG. 5 is a sectional view of the same parts and taken along the same line as in FIGS. 2, 3, and 4, but showing the hold-down strap in the process of being lowered to its position of FIG. 2, and the latch member being kicked up by its engagement with the end of the hold-down strap.

Figure 1:
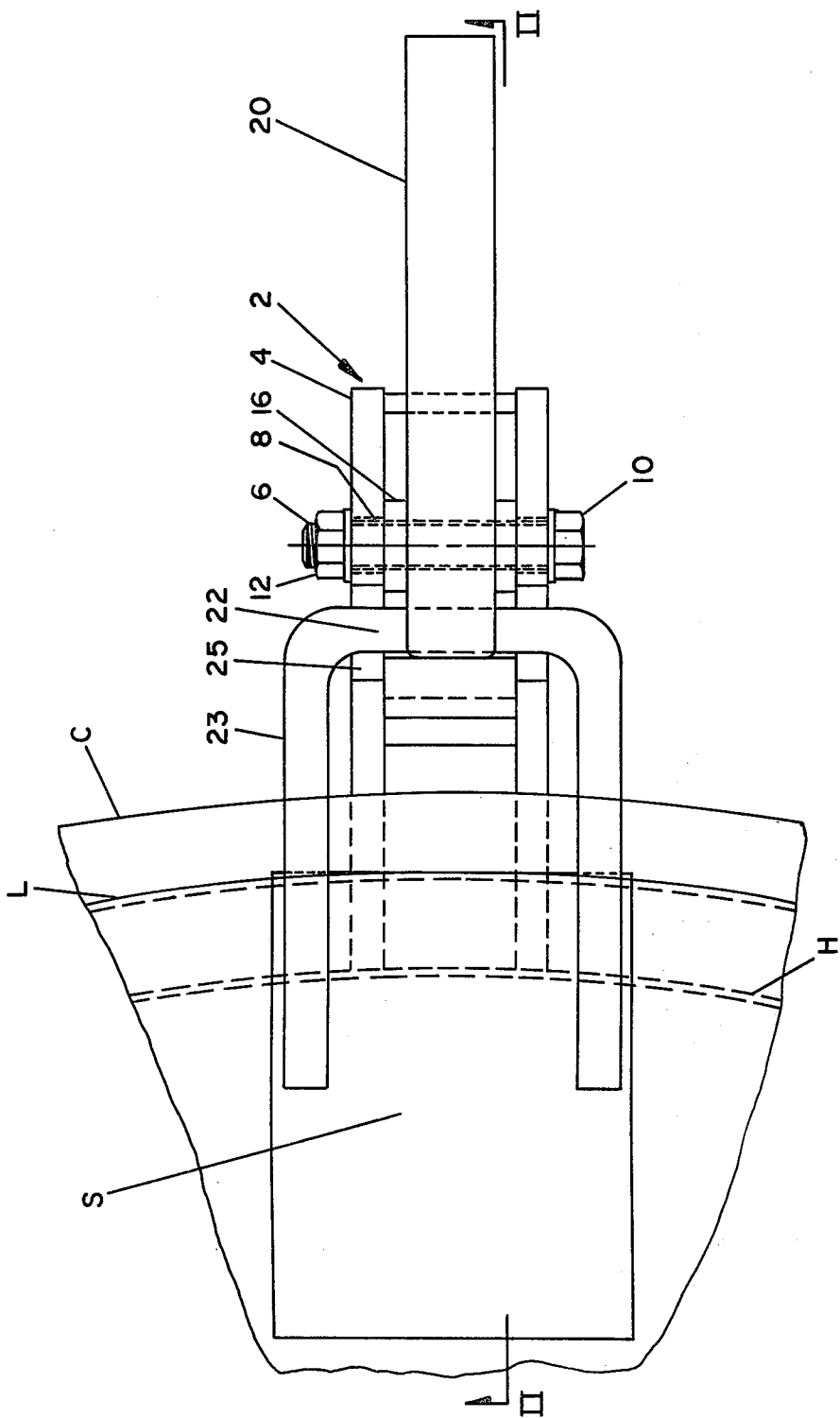
FIG. 1 is a top view of a latch assembly, shown with the end of a hold-down strap and a portion of a railway car hatch frame and hatch cover with which the latch assembly is used, illustrating one embodiment of the present invention.

Referring to FIGS. 1 and 2, a portion of a railway car hatch frame H is shown with corresponding portions of its cover C and hold-down strap S. Attached to the side of the hatch frame H and holding one end of the hold-down strap S in place is a latch assembly 2 that embodies the present invention. The drawings do not show the opposite side of the hatch frame H, where the hold-down strap S is connected by a hinge to the hatch frame H. That hinge may be either a conventional hinge device or, since the latch assembly 2 of the present invention is also capable of functioning as a hinge, the hold-down strap S may be connected to another latch assembly 2. In either event, the hold-down strap S is pivoted about a distant axis on the opposite side of the hatch frame H, so that when the end of the strap S shown in the drawings is lifted, it travels through an arc a shown in FIGS. 2 through 5.

If desired, the hold-down strap S may be welded to the middle of the hatch cover C so that the cover C is raised with the strap S, but such an attachment is not necessary. If desired, a handle may be provided in the center of the cover C, with the strap S passing through the handle so that the cover C hangs loosely from the strap S when the strap is raised. Again, this is a matter of choice that is not related to the present invention. The important function of the strap S is to apply a downward pressure on the cover C to hold it firmly on the lip L of the hatch frame H, and the strap S performs this function when it is locked in place as shown in FIG. 2 by the latch assembly 2.

The detailed parts of the latch assembly 2 include two upwardly standing parallel latch support plates 4 that are attached to one side of the hatch frame H. A latch member pivot pin 6 extends between the plates 4 and is held in holes 8 of plates 4 by means of a hexagonal head 10 on one end and a hexagonal nut 12 threaded on its other end. A latch member 14 pivots on the pivot pin 6 and is retained from axial sliding between the plates 4 by annular spacers 16. The latch member 14 comprises a latching portion 18 on one side of the pivot pin 6, and a counterweight portion 20 on the other side of the pin 6. The counterweight portion 20 also functions as a handle for rotating the latch member 14 in and out of its locked position.

The latch assembly 2 also includes a latch bar 22 that forms the end of the hold-down strap S. The latch bar 22 is bent at both ends into a U-shape (FIG. 1) with two legs 23 that are welded to the remaining portion 24 of the strap S. Between its legs 23, the latch bar 22 extends substantially parallel to the pivot pin 6.

The upwardly standing latch support plates 4 have slots 25 extending downwardly from their top edges. The slots 25 are designed to allow the latch bar 22 to travel freely along the arc a when the hold-down strap is pivoted about its hinged axis on the opposite side of the hatch frame H.

An L-shaped plate 26 is positioned between the latch support plates 4 and is welded at both lateral edges to the plates 4. A vertical portion 27 of the plate 26 extends along the sides of the slots 25 that face toward the hatch frame H. At its upward end, the vertical portion 27 is bent backwardly to form a latch member seat 28 that supports the underside edge 29 of the latch member counterweight portion 20 when the latter is raised to an overcenter position as shown in FIG. 3. A horizontal portion 30 of the L-shaped plate 26 supports the latch bar 22 when the hold-down strap S is in its lowest position shown in FIG. 2. The vertical portion 27 and the horizontal portion 30 of the L-shaped plate 26 meet to form a hinge seat that extends around the side of the latch bar 22 opposite from the side engaged by the latching portion 18 of the locking member 14. The plate 26 and latching portion 18 surround the latch bar 22 so that no space between the plate 26 and the latching portion 18 on either side of the latch bar 22 is large enough to permit the latch bar 22 to escape. Thus, when the latch member 14 is in the position shown in FIGS. 1 and 2, the latch bar 22 is hinged firmly to the latch support plates 4, allowing the hold-down strap S to be pivoted about the latch bar 22 when the opposite end of the hold-down strap S on the opposite side of the hatch frame H is unlatched and lifted upwardly.

In operation, the latch assembly 2 may be unlocked to free the latch bar 22 from its hinged connection shown in FIG. 2 simply by raising the counterweight portion 20 of the latch member 14 to the overcenter position shown in FIG. 3. With the latch member 14 in this position, the workman has both hands free to raise the hold-down strap S.

When the hold-down strap S is raised from its FIG. 3 position to the position shown in FIG. 4, the latch bar 22 contacts the underside edge 29 of the latch member counterweight portion 20 and kicks the latch member 14 back to where it is shown in FIG. 4, which is the same as the original position of the latch member 14 shown in FIG. 1. Now, of course, the latching portion 18 of the latch member 14 is no longer retaining the latch bar 22.

When one desires to relatch the end of the hold-down strap S to secure the cover C to the hatch frame H, the strap S is lowered toward its original position shown in FIG. 1, with the latch bar 22 on the end of the strap S first passing through the position shown in FIG. 5. In this position, the latch bar 22 engages the top surface of the latching portion 18 of the latch member 14 and kicks up the latch member 14 so that the counterweight portion 20 is raised to the position shown in FIG. 5. The counterweight portion 20 remains in this raised position until the latch bar 22 has passed downwardly clear of the latching portion 18. Upon such clearance, the latch bar 22 seats on the L-shaped plate 26 as shown in FIG. 1, and the latch member 14 returns to is position shown in FIG. 1 with the latching member 18 swinging upwardly and over the latch bar 22 to lock the end of the hold-down strap S firmly in place.

The latch assembly 2 thus provides a latch member 14 that automatically locks in place the latch bar 22 on the end of the hold-down strap S upon the lowering of the strap the position shown in FIG. 2, yet the latch member 14 can is also be raised to the position shown in FIG. 3, giving a workman the ability to use both hands in lifting the strap S, and to set a plurality of latch members in their unlocked positions. Also, in addition to latching the end of strap S, the latch assembly can also serve as a hinge, when the end of the strap S opposite from the latch bar 22 is raised. If desired, the latch assemblies on both ends of the strap S may be unlocked, and the cover C lifted completely off the hatch opening.

While only one embodiment of the present invention has been thus shown and described, other embodiments, modifications and additions will be apparent to those skilled in the art, without departing from the scope of the appended claims.

I claim:

1. A latch assembly for locking in place one end of a hold-down strap that secures a railway car hatch cover to a hatch frame, said latch assembly including a latch support means connected to said hatch frame, a latch member pivotally connected about a substantially horizontal axis to said latch support, said latch member having on one side of said pivot axis a latching portion engageable with said end of said hold-down strap and a counterweight portion on the other side of said pivot axis, said latching portion being positioned to swing downwardly and out of the way of said end of said hold-down strap in response to engagement by said hold-down strap end during the downward travel of said strap end, said counterweight portion being positioned to drop under the force of gravity when said hold-down strap end has moved to a position below said latching portion, so as to rotate said latch member and cause said latching portion to swing upwardly and over said hold-down strap end to prevent the return, upward movement of said hold-down strap, characterized by the improvement comprising:
   a. a latch bar forming said end of said hold-down strap, said latch bar extending substantially parallel to said pivot axis of the latch member, and means connecting said latch bar to the remaining portion of said hold-down strap and holding said latch bar spaced from said remaining portion of said hold-down strap; and
   b. a hinge seat mounted on said latch support and located adjacent the position of said latch bar when said latching portion has swung over said bar to prevent the return, upward movement of said hold-down strap, said hinge seat extending around the side of said latch bar opposite from the side engaged by said locking portion of said latch member, so such extent that any space between said hinge seat and said latching portion on either side of said latch bar is too small for passage of said latch bar, said hinge seat and latching portion thus hinging said latch bar to said hatch frame and allowing said hold-down strap to be pivoted about said latch bar when the opposite end of said hold-down strap is unlatched.

2. The latch assembly according to claim 1 characterized also by the improvement comprising:
   a. said latch support being in the form of two substantially parallel, upwardly standing plates with slots extending downwardly from the top edges of said plates for allowing passage of said latch bar;
   b. an L-shaped plate mounted between said two upwardly standing plates, with a substantially vertical portion extending along the sides of said slots that are toward said hatch frame, and a subtantially horizontal portion extending directly under the position of said bar when said latching portion of said latch member has swung over said bar to prevent the return, upward movement of said hold-down strap, said vertical portion and said horizontal portion meeting to form said hinge seat, and said vertical portion forming near the top end thereof said latch member seat; and
   c. said bar being bent at both ends to a U-shaped form, the two legs of the U-shape being connected to said remaining portion of said hold-down strap, said legs being positioned laterally beyond the external surfaces of said upwardly standing plates, with the portion of said U-shaped latch bar between said legs extending through said slots when said hold-down strap is lowered to secure said hopper car hatch cover.

3. The latch assembly according to claim 1 characterized also by the improvement comprising:
   a latch member seat mounted on said latch support and located to engage and support said counterweight portion of said latch member in a raised, overcenter position, wherein said latching portion is rotated to and held in a position out of the way of said end of said hold-down strap.

* * * * *

UNITED STATES PATENT AND TRADEMARK OFFICE
CERTIFICATE OF CORRECTION

PATENT NO. : 4,403,798
DATED : September 13, 1983
INVENTOR(S) : Robert J. Smith

It is certified that error appears in the above–identified patent and that said Letters Patent are hereby corrected as shown below:

Column 6, line 4, "so" should read ---to---.

Column 6, line 21, "subtantially" should read ---substantially---.

Signed and Sealed this

Fifteenth Day of November 1983

[SEAL]

Attest:

GERALD J. MOSSINGHOFF

Attesting Officer

Commissioner of Patents and Trademarks